United States Patent [19]

de Nevers et al.

[11] Patent Number: 5,501,132
[45] Date of Patent: Mar. 26, 1996

[54] DRY PREPARATION OF PARTICULATE SOLID ENERGETIC MATERIAL

[75] Inventors: Clark C. de Nevers, Salt Lake City; Jeffrey L. Nelson, Kearns; Steven T. Newsome, Magna; Patrick R. Oyler, Sandy; Robert A. Patterson, West Jordan, all of Utah

[73] Assignees: Global Environmental Solutions, Inc., Hopkins, Minn.; Hercules Incorporated, Wilmington, Del.

[21] Appl. No.: 298,929

[22] Filed: Aug. 31, 1994

[51] Int. Cl.⁶ .............................. F42B 33/00; B26D 7/00; C06B 21/00
[52] U.S. Cl. ................................ 86/24; 269/3.4; 269/3.6; 149/124; 83/747; 83/769
[58] Field of Search ............... 86/20.11, 24, 1.1; 264/3.4, 3.6; 149/124; 83/747, 769

[56] References Cited

U.S. PATENT DOCUMENTS

| | | | |
|---|---|---|---|
| 891,719 | 6/1908 | Newell | 83/747 |
| 1,651,101 | 11/1927 | Pays | 83/747 |
| 2,453,899 | 11/1948 | Gaines | 83/769 |
| 2,823,446 | 2/1958 | Crane | 29/76 |
| 3,216,307 | 11/1965 | Griffith | 86/20.11 |
| 3,783,735 | 1/1974 | Murphy et al. | 86/20.11 |
| 4,014,655 | 3/1977 | Brunnberg | 264/3.4 X |
| 4,376,666 | 3/1983 | Williams, Jr. | 264/3.4 X |
| 4,585,600 | 4/1986 | Rollyson et al. | 264/3.1 X |
| 4,662,893 | 5/1987 | McIntosh | 23/293 R |
| 5,114,630 | 5/1992 | Newman et al. | 264/3.1 X |
| 5,341,717 | 8/1994 | Feldman | 86/32 |

*Primary Examiner*—Peter A. Nelson
*Attorney, Agent, or Firm*—Donald W. Huntley

[57] ABSTRACT

Energetic material can be rapidly cut or machined at high speed in the substantial absence of liquid coolant with a cutting tool having a rotating cutting surface by maintaining a portion of the cutting surface out of contact with the energetic material and continuously removing the resulting reduced energetic material from the area of the cutting tool.

15 Claims, 2 Drawing Sheets

DRY PREPARATION OF PARTICULATE SOLID ENERGETIC MATERIAL

BACKGROUND OF THE INVENTION

The demilitarization of rocket motors, warheads, munitions, mines, bombs and other instruments of warfare containing solid explosives and other energetic materials typically involves size reduction of the solid energetic material. This size reduction facilitates subsequent disposal or recycling. In the past, size reduction has been carried out with the aid of copious amounts of liquid. The liquid typically was used for one or more purposes, such as a solvent, a cutting or transporting medium, or a cooling medium. While this has been widely demonstrated and used for size reduction, the liquid becomes a contaminant in the resulting particulate product. In addition, the energetic material contaminates the liquid. The contaminated liquids, after use in size reduction process, accordingly typically require special handling and disposal techniques.

SUMMARY OF THE INVENTION

The instant invention provides an improved process for the substantially dry size reduction of solid energetic materials.

Specifically, the present invention provides a process for preparation of particulate solid energetic material comprising:

(a) mounting a mass of energetic material for the application of a cutting tool having a rotating cutting surface;

(b) bringing the rotating cutting surface in contact with the energetic material by movement of at least one of the cutting tool and the energetic material, the position and motion of the cutting tool and the energetic material being such that a portion of the cutting surface is out of contact with the energetic material; and (c) continuously removing the resulting particulate energetic material from the area of the cutting tool, the process being carried out in the substantial absence of liquid coolant.

DETAILED DESCRIPTION OF THE INVENTION

Figure 1:
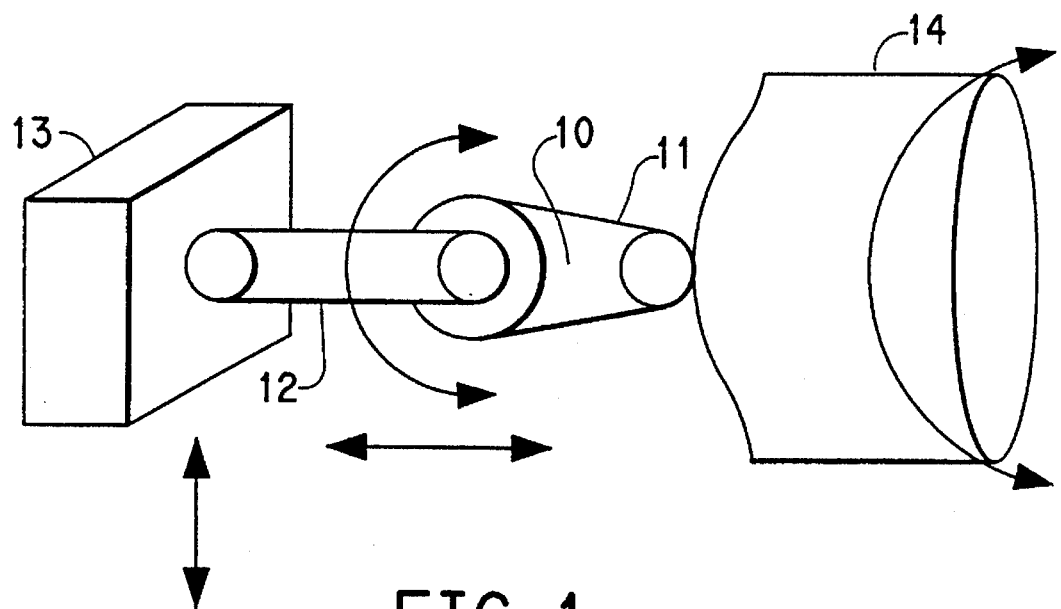
FIGS. 1 and 2 are schematic illustrations of the relative positioning of a cutting tool and solid energetic material that can be treated according to the present invention.

The instant process is applicable to a wide variety of solid energetic materials, including, for example, propellants, explosives and pyrotechnics. Illustrative of the propellants to which the present invention is applicable are Class 1.1 propellants such as CMDB, XLDB, and NEPE propellants, and Class 1.3 propellants such as PBAN, CTPB and HTPB propellants. The invention is also applicable to monolithic bulk explosives.

The energetic material is often contained in a casing, such as those found in rocket motors, warheads, munitions and bombs. In that event, any elements are first removed from the casing that would restrict access to the energetic material such as nozzles, igniters, fuses, closures, and the like. The energetic material is then mounted for application of the cutting tool.

The energetic material is preferably mounted rotatably. The rotatable mounting can vary widely, and can be applied to the article itself, the article holder, or a table in which or on which the solid energetic material is fixed. Rotation can be accomplished by any conventional mechanical means, such as casters, rotary bearings, a lathe chuck or the like. It has been found particularly convenient, for rocket motors and the like having a longitudinal configuration, to hold the article so that it can be rotated while maintaining the center line of the article in a horizontal position and to facilitate the application of the cutting tool.

Cutting tools used in the present process can be selected from a wide variety of commercially available equipment, consistent with the size and configuration of the solid energetic material to be treated and with the desired ultimate size to which the energetic material is reduced.

A wide variety of cutting tools can be used in accordance with the instant process. For example, standard end mills with a flat end or ball end cutting surface have been found satisfactory. In addition, end mill tools can be designed with varying lengths and diameters, cutter shapes, depths, wave height, knuckle pitch and number of flutes to suit the size and configuration of the energetic material being treated.

Typical of the standard mills that can be used in the present invention are roughing end mills commercially available in a wide variety of sizes, number of flutes and end configurations. Available manufacturers of such mills include Cleveland Twist Drill, OSG, Putnam and Niagra. Similarly, a wide variety of roughing ball end mills is available. The particular cutting surface selected will depend on the particular energetic material being treated and its configuration, according to standard safety protocols, and the desired size of the resulting reduced material.

The positioner machine can be a horizontal boring machine, a turret lathe, a robot, or any other commercially available positioning system adaptable to bringing the article and the cutting tools into contact with the energetic material in a manner consistent with the requirements of the instant process. The centerline of the energetic material article can be horizontal or vertical or any other desired angle.

Often the energetic material being treated has a central aperture or cavity, as in the case of a rocket motor. The cutting tool can conveniently be first applied in this central aperture. The cutting tool is rotated and positioned to remove the energetic material in successive annular sections or cutting passes. In such cutting passes the cutting tool is translated by a conventional boring machine shaft and the energetic material article is rotated. The radial cutting position can be changed by changing the position of the boring machine shaft between cutting passes.

Such an arrangement is schematically illustrated in FIG. 1 in which a cutting tool, generally indicated as 10, and having cutting surface 11, is mounted on rotating spindle 12. The spindle is mounted on base 13, which can be moved or translated both vertically and horizontally. The energetic material 14 to be treated is rotatably mounted by means suitable for the particular article.

Standard cutting tools can also be used mounted to a drive motor perpendicular to the center line of the solid energetic material. In this context, depending on the configuration of the article being treated and the cutting tool used, either or both of the cutting tool and the article can rotate. The radial cutting position can be changed by changing the position of the boring machine shaft between cutting passes.

Figure 2:
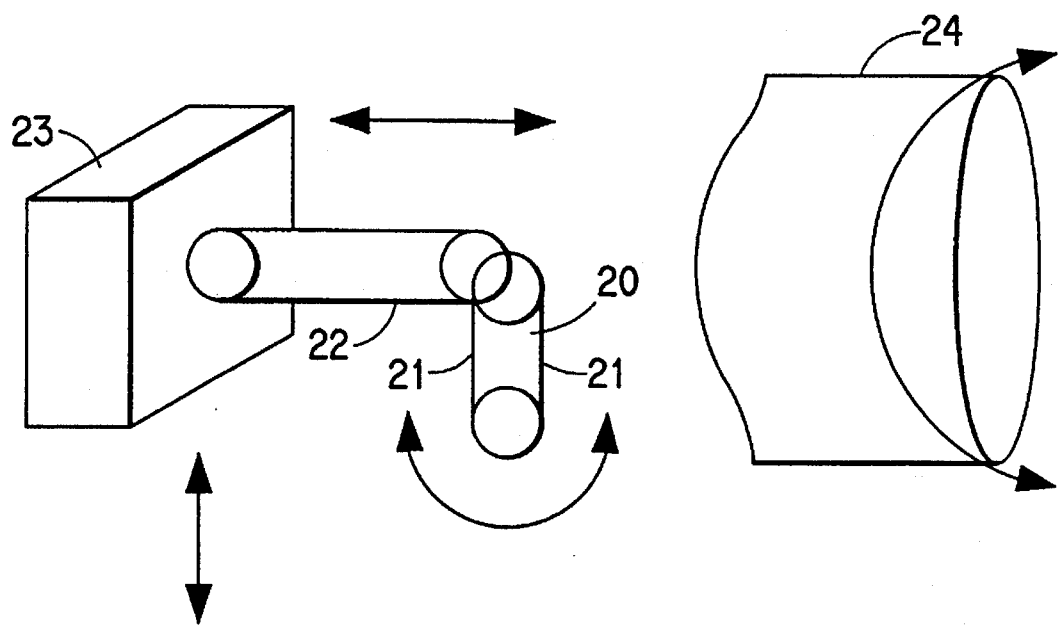

One such arrangement is schematically illustrated in FIG. 2, in which the cutting tool 20, having cutting surface 21, is rotatably mounted on spindle 22, which, in turn, is mounted on base 23. The spindle can be translated horizontally and vertically. The article 24 is rotatably mounted by conventional means not shown.

In still another apparatus arrangement, a standard cutting tool is mounted to a drive motor oriented perpendicular to the center line of the solid energetic material. The cutting tool and drive motor are slidably mounted for radial positioning, such that the energetic material article does not rotate, and the rotation as well as translation in consecutive passes are brought about by the boring machine shaft. The radial cutting position, in this arrangement, is changed by slidably adjusting the cutter tool drive motor and cutting tool radial position between cutting passes.

The cutting tool can also be mounted at an angle which is neither parallel with, nor perpendicular to, the centerline of the energetic material. It has been found that a cutting tool mounted at such an angle can be used to increase the diameter of the center aperture or cavity of an energetic material article. This increase in diameter can be sufficient to allow an use of an apparatus which would not otherwise be permitted to enter the aperture because of an unacceptably large diameter. In this annular pass the cutting tool must precede the remainder of the apparatus as it enters into and simultaneously increases the diameter of the center aperture in the energetic material.

In general, the cutting tool is fed into the article by extending the spindle onto which the cutting tool is mounted. Typically, this operation is conducted remotely for live propellant, according to standard handling procedures for energetic materials. Starting and stopping positions of the spindle can be monitored remotely and recorded at intervals to verify the cutting tool feed rate. If collection of the reduced energetic material is done batchwise, the spindle travel distance should be set by a protocol to remove a predetermined volume of energetic material at a time to avoid overloading the collection system.

The size to which the energetic material is reduced will vary widely, depending on the subsequent recycling or disposal for which the material is being prepared. However, the minimum dimensions for the chips or particles produced by the present invention should be at least about 0.020 inch, and preferably at least about 0.050 inch, to minimize the possibility of electrostatic discharge in a dust phase.

The particle size and configuration of the product resulting from the process can be widely varied, from dust to ribbons or slivers of material to complex particulate shapes.

The size and shape of the cut energetic material will depend on the shape of the tool, what portion of the tool is engaging the material and the ratio of the tool rotation and translation speeds.

The removal rate will depend on the size of the swath cut by the tool and rate of translation of the cutting tool through the energetic material.

The cutter rotation rate and translation rates can be varied widely. In general, the rates are selected such that the relative velocity between the tool and the energetic material is maintained below a value which a skilled practitioner would consider to present an acceptable risk of ignition.

It has been found that propellant size reduction at a rate of several hundred or even several thousand pounds per hour is possible, depending on the particular energetic material involved and the desired particle size and configuration of the final material.

A further element of the instant process is the continuous removal of the resulting reduced energetic material from the area of the cutting tool. The removal can be accomplished by variety of means, including gravity, where appropriate, or pneumatic apparatus. The pneumatic apparatus, for example, can include vacuum as well as pressurized gas. An important consideration in the process is to remove the reduced material at a rate fast enough that it does not reenter the cutting zone. Such recycling of the material to the cutting zone has a variety of undesirable consequences. First, the repeated cutting of the material disrupts the uniformity of the particle size of the energetic material. In addition, return of the material to the cutting zone can undesirably increase the temperature. Moreover, the presence of exceptionally fine comminuted solid energetic material can increase the probability of ignition from electrostatic discharge.

The handling of reduced energetic material can be carried out in any convenient manner, as will be evident to those skilled in the art. For example, the resulting energetic material can be transported out of the cutting zone through a ducting subassembly mounted near the cutting area. The material can be carried through ducting or conductive hose into a knockout chamber. A cyclonic gas path through the knockout chamber will separate most energetic material from the gas stream. Other particle separation techniques such as a gravity settler or bag house can also be used. The separated energetic material can be collected in a suitable container and the gas stream passed through suitable filtering apparatus before discharge to the atmosphere.

Another important consideration in the operation of the instant process is the velocity of pickup for the removal apparatus. This is the air velocity required to entrain the energetic material and remove it from the cutting zone. Depending on placement of the inlet of the collection system relative to the cutting zone, the required pickup velocity can vary widely. An additional consideration is the air velocity which will suspend the energetic material in transport through ducting and hose. Collection velocities of at least about 6,000 feet per minute are particularly preferred for a pneumatic transport system.

Figure 3:
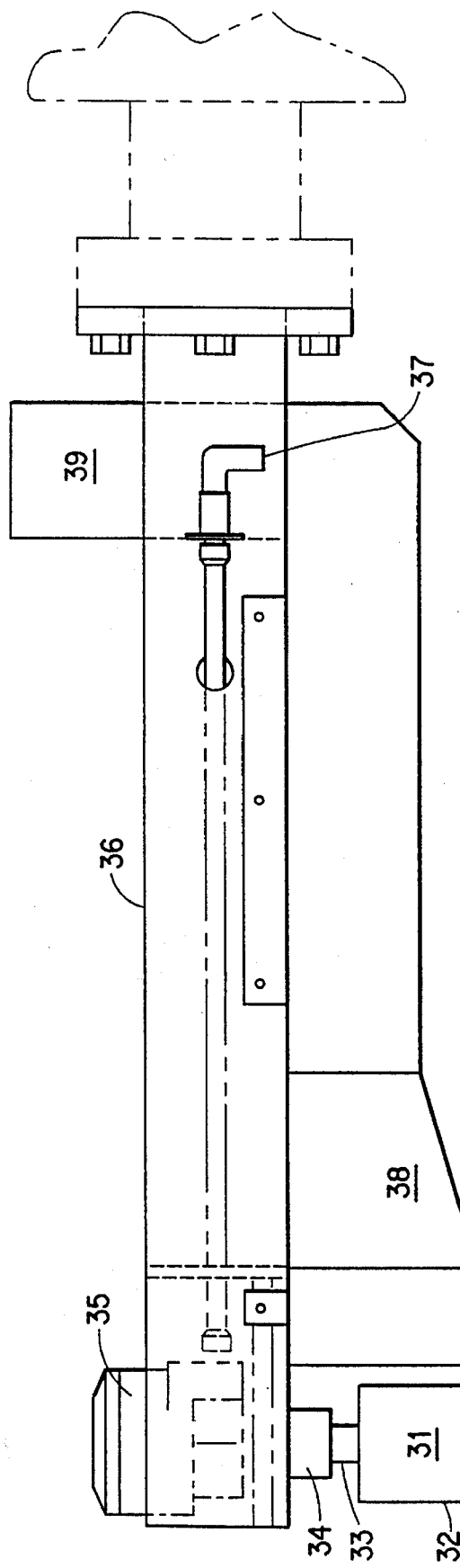
FIG. 3 is a schematic illustration of a cutting tool and removal means that can be used in the present invention.

A schematic illustration of a typical apparatus that can be used in the present invention is shown in FIG. 3. There, roughing end mill 31 having cutting surface 32 is mounted on shaft 33. This is connected, through adapter 34 to hydraulic motor 35. The entire assembly is mounted on positioning means 36, which includes connection 37 for hydraulic power for the motor. Chip collector 38, connected through duct 39 to vacuum means, not shown, is positioned behind the cutter to collect the particulate material as it is generated by the cutting surface.

Further safety precautions, as will be evident to the skilled practitioner, include control of electrostatic discharge in the pneumatic handling apparatus of the resulting particles of energetic material. For example, depending on the particular material being treated, such controls may include means for adjusting the humidity and metered addition of conductive additives such as carbon black, graphite flake, or graphite fiber.

In a preferred embodiment of the present invention, cooling of the overall operation is further facilitated by application of an inert cooling gas, such as air or nitrogen. The cooling gas can further facilitate the removal of the resulting particulate energetic material from the area of the cutting tool.

The temperature of the instant process is controlled by a number of factors, including the removal of material as discussed above, the speed of the cutting tool, and the further requirement that a portion of the surface area of the cutting surface is out of contact with the energetic material for a part of each revolution. In general, even a relatively small percentage of the cutting surface out of contact with the energetic material will aid in maintaining the overall temperature within the desired range. Typically, at least about 50% of the cutting surface is out of contact with the energetic material, and preferably at least about 75% of the cutting surface of the tool is out of contact with the energetic material at any point in the operation of the process.

In accordance with the instant process, the speed of the cutting tool, the rate of removal of the energetic material and the percentage of the cutting surface in contact with the energetic material are adjusted to maintain the temperature rise of the energetic material safely below the ignition point. The degree to which the temperature is maintained below the ignition point will be governed by the safety standards applicable to the particular material being treated, according to the protocols for the evaluation and management of risks inherent in handling energetic and explosive materials. These protocols should be applied in an incremental scale up of the process, evaluating at each step the potentials of the process compared to the ignition or initiation threshold of the energetic material being processed.

The temperature rise of the energetic material and the cutting tool is an important factor in the operation of the process. This temperature rise can be directly compared to the threshold temperature rise which might cause auto ignition or point ignition of the energetic material, and monitored using infrared thermography. The process can be safely operated when the temperature rise in the process is significantly less than that which might cause ignition.

As will be evident to the skilled practitioner in this area, other operational parameters that must be controlled for safe operation include chatter, electrostatic charging of chips and equipment, and entrapment of explosive materials in threads, joints, weld pits, and other typical explosive handling hazards. The energetic material being treated should also be carefully surveyed for foreign objects imbedded in the material that, on contact with the cutting tool, could cause ignition. In a preferred embodiment of the present invention, detection means, such as X-ray apparatus, capacitive, inductive, acoustic or microwave sensors, are incorporated into the apparatus on which the cutting tool is mounted, thus permitting detection of embedded objects in the course of the size reduction operation.

The process of the present invention is applicable to a wide variety of energetic materials, permitting the safe removal and size reduction of those materials with the production of a wide range of sizes and shapes of energetic material. The process is a desirable alternative to open burning and open detonation of monolithic propellant and explosive articles by safely making the material available for reclamation, recycling, and reuse processes such as ingredient recovery, heat recovery, or use as commercial or military explosives. In addition, with the elimination of cooling liquid, the process minimizes the production of large volumes of secondary hazardous materials which, in turn, require special handling and disposal. Further, the process is amenable to control by infrared thermography, which enhances the safety and productivity of the high speed dry machining.

The process can be effectively performed using remote control, and the equipment used is transportable. In addition, the present process can be used in the initial production of finished articles, in which propellant is removed to create a desired shape and surface finish, or ballistic grain configuration, in the remaining propellant. This configuration can be in the form of radial grooves, fins, and the like, as known in the art, and otherwise attained, for example, by molding operations.

We claim:

1. A process for preparation of particulate solid energetic material comprising:
   (a) mounting a mass of solid energetic material in a casing for the application of a cutting tool having a rotating cutting surface;
   (b) bringing the rotating cutting surface in contact with the energetic material by movement of at least one of the cutting tool and the energetic material, the position and motion of the cutting tool and the energetic material being such that a portion of the cutting surface is out of contact with the energetic material; and
   (c) continuously removing the resulting particulate energetic material from the area of the cutting tool, the process being carried out in the substantial absence of liquid introduced as a coolant.

2. A process of claim 1 wherein the speed of the cutting tool, the rate of removal of the resulting energetic material and the percentage of the cutting surface in contact with the energetic material are adjusted to maintain the temperature rise of the energetic material below its ignition point.

3. A process of claim 1 wherein any elements on the casing that restrict access to the energetic material are removed before bringing the cutting tool in contact with the energetic material.

4. A process of claim 3 wherein the cutting tool is maintained substantially out of contact with the casing.

5. A process of claim 1 wherein the particulate energetic material is removed by pneumatic apparatus.

6. A process of claim 5 wherein the pneumatic apparatus is a vacuum apparatus.

7. A process of claim 3 wherein the casing comprises an outer shell and a polymeric liner immediately inside the outer shell, and wherein the cutting tool removes the energetic material from the polymeric liner.

8. A process of claim 7 wherein the polymeric liner is thereafter removed from the casing by application of the cutting tool.

9. A process of claim 3 wherein the energetic material in the casing is a configured ordnance item.

10. A process of claim 3 wherein the energetic material in the casing is a propulsion unit.

11. A process of claim 10 wherein the propulsion unit is a rocket.

12. A process of claim 1 wherein at least about 50% of the surface area of the cutting surface of the tool is out of contact with the energetic material.

13. A process of claim 4 wherein the temperature rise is maintained at less than 25% of that required to reach the ignition point of the energetic material.

14. A process of claim 13 wherein the temperature rise of the energetic material is maintained a suitable small fraction of the rise required to reach the ignition point of the energetic material.

15. A process of claim 1 wherein the cutting tool and its speed of operation are selected to result in particles having a minimum dimension of at least about 0.020 inch.

\* \* \* \* \*